United States Patent
Pech et al.

(10) Patent No.: US 9,217,647 B2
(45) Date of Patent: Dec. 22, 2015

(54) GUIDEBOOK TRANSIT ROUTING

(71) Applicant: Google Inc., Mountain View, CA (US)

(72) Inventors: Lucien Pech, Zurich (CH); Albert Graells, Zurich (CH)

(73) Assignee: Google Inc., Mountain View, CA (US)

(*) Notice: Subject to any disclaimer, the term of this patent is extended or adjusted under 35 U.S.C. 154(b) by 122 days.

(21) Appl. No.: 13/893,947

(22) Filed: May 14, 2013

(65) Prior Publication Data

US 2014/0343852 A1  Nov. 20, 2014

(51) Int. Cl.
*G01C 21/00* (2006.01)
*G01C 21/34* (2006.01)

(52) U.S. Cl.
CPC .................... *G01C 21/3423* (2013.01)

(58) Field of Classification Search
CPC ............ G01C 21/00; G01C 21/3492; G01C 21/3461; G01C 21/34; G01C 21/3415; G01C 21/3446; G01C 21/3453; G01C 21/206; G01C 21/3423; G01C 21/343; G01C 21/3476; G01C 21/3484; G01C 21/3617; G01C 21/3644; G01C 21/3679; G06Q 10/02; G06Q 10/06311
USPC ........................ 701/400–541; 340/988–996
See application file for complete search history.

(56) References Cited

U.S. PATENT DOCUMENTS

| | | | |
|---|---|---|---|
| 7,595,740 | B2 | 9/2009 | Pechenick et al. |
| 2009/0005965 | A1 | 1/2009 | Forstall et al. |
| 2009/0119001 | A1* | 5/2009 | Moussaeiff .......... G01C 21/005 |
| | | | 701/532 |
| 2010/0094534 | A1 | 4/2010 | Naick et al. |
| 2011/0022304 | A1 | 1/2011 | Lee |
| 2011/0112759 | A1 | 5/2011 | Bast et al. |
| 2012/0004840 | A1* | 1/2012 | Lee .................... G01C 21/3423 |
| | | | 701/465 |
| 2012/0232776 | A1 | 9/2012 | Gontmakher et al. |
| 2014/0244326 | A1* | 8/2014 | Modica ............ G06Q 10/06311 |
| | | | 705/7.13 |

FOREIGN PATENT DOCUMENTS

| | | |
|---|---|---|
| EP | 1098287 | 5/2001 |
| EP | 1134716 | 9/2001 |
| EP | 1934557 | 6/2008 |
| EP | 2217880 | 8/2010 |
| EP | 2317283 | 5/2011 |
| EP | 2454557 | 5/2012 |

(Continued)

OTHER PUBLICATIONS

International Search Report dated Sep. 1, 2014—3 pages.

(Continued)

*Primary Examiner* — Muhammad Shafi
(74) *Attorney, Agent, or Firm* — Dority & Manning, P.A.

(57) ABSTRACT

Systems and methods for recommending time independent or "guidebook" transit routes between an origin and a destination are provided. A score is generated for each transit route. The score can be used to evaluate and prioritize the transit routes so that one or more transit routes can be recommended to a user. The score can be computed based on characteristics of a trip duration function generated for the transit route. The trip duration function specifies a trip cost (e.g. a trip duration) for the transit route as a function of time (such as departure time or arrival time) over the time interval. The trip duration function can be a piecewise linear function with one or more linear trip segments. Each linear trip segment models the trip cost, including waiting time, of a transit trip associated with the transit route over at least a portion of the time interval.

13 Claims, 8 Drawing Sheets

(56) References Cited

FOREIGN PATENT DOCUMENTS

| | | |
|---|---|---|
| KR | 10-2009-000417 | 1/2009 |
| WO | WO 2012-070379 | 5/2012 |

OTHER PUBLICATIONS

Delling et al., "Computing and Evaluating Multimodal Journeys", Kartsruhe Reports in Informatics 2012, Oct. 20, 2012—19 pages.

* cited by examiner

GUIDEBOOK TRANSIT ROUTING

FIELD

The present disclosure relates generally to public transportation trip planning and more particularly to analyzing and selecting time independent transit routes or "guidebook" transit routes between an origin and a destination for recommendation to a user.

BACKGROUND

Many services exist for planning a route using a transit system. Typically, a user inputs a departure and/or arrival time as well as origin and destination locations to the transit planning service. The transit planning service can then use the user inputs and transit schedules to suggest one or more transit options that can get the user from the origin to the destination at the prescribed departure and/or arrival time. The transit planning services can plan transit trips involving multiple modes of transportation, including railway transportation, buses, ferries, etc.

In some situations, a user may not be interested in obtaining a transit trip for a particular departure and/or arrival time. Rather, the user is interested in time independent transit routes that represent typically good trips between the origin and destination over the course of a time interval, such as during business hours. These time independent routes or "guidebook" routes may be analogous to a typical or usual route one might take from the origin to the destination, such as a route that one might find in a guidebook or a tourist brochure.

Many different time independent transit routes may be available between the origin and the destination. The time independent transit routes can have many different characteristics. For instance, one time independent transit route can have shorter duration but can be less frequent. Another time independent transit route can be more frequent, but can have a longer duration. It can be difficult to compare these different time independent transit routes to determine which time independent transit routes to recommend to a user.

SUMMARY

Aspects and advantages of the invention will be set forth in part in the following description, or may be obvious from the description, or may be learned through practice of the invention.

One exemplary aspect of the present disclosure is directed to a computer-implemented method of transit route planning. The method includes identifying a plurality of time independent transit routes between an origin and a destination. Each of the time independent transit routes comprises a plurality of trips over a time interval. Each of the transit routes can include one or more modes of transportation. The method can include generating a trip duration function for each of the plurality of time independent transit routes. The trip duration function specifies a trip cost (e.g. a trip duration) for the time independent transit route as a function of time over the time interval. The trip duration function can be a piecewise linear function comprising a plurality of linear trip segments. Each linear trip segment models the trip cost, including waiting time, of one of the plurality of trips in the time independent transit route as a function of time. The method further includes computing, with a processing device, a score for each of the plurality of time independent transit routes based at least in part on an average cost of the time independent transit route over the time interval. The average cost is calculated using the trip duration function. The method further includes storing the score for each of the plurality of time independent transit routes in a memory.

Other exemplary aspects of the present disclosure are directed to systems, apparatus, non-transitory computer-readable media, computer program products, user interfaces and devices for transit route planning.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
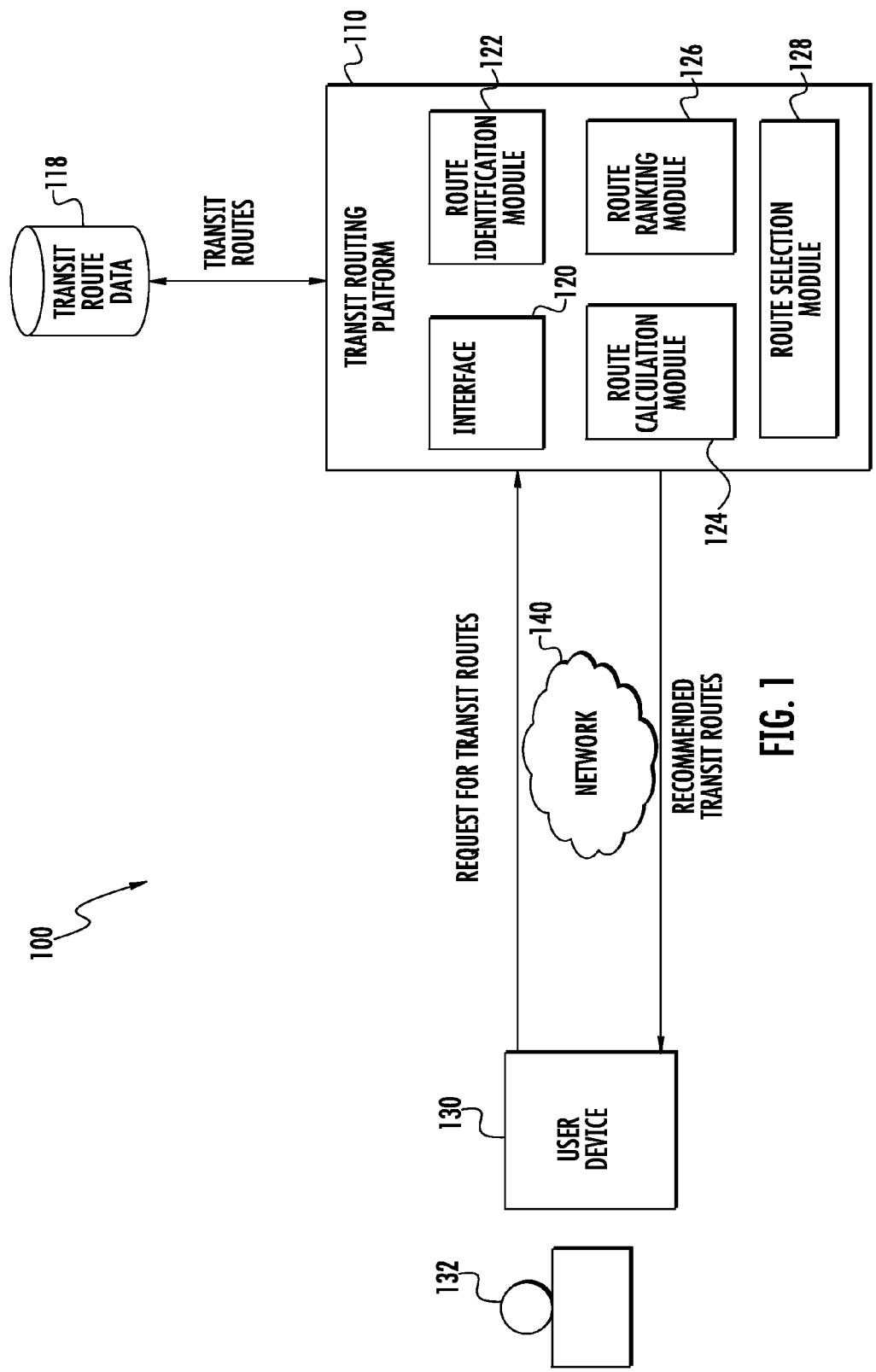
FIG. 1 depicts an overview of an exemplary system for transit route planning according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to recommending time independent or "guidebook" transit routes between an origin and a destination. A recommended time independent transit route does not necessarily recommend a particular transit trip that occurs at a particular time. Rather the time independent transit route can include or be associated with a plurality of transit trips over the transit route between the origin and destination over a given time interval, such as over the course of a business day.

For instance, a recommendation of time independent transit routes can take the form: "Take tram 3 or tram 4 between Station S and Station T between the hours of 8:00 a.m. and 6:00 p.m." The time independent transit route "tram 3" can be associated with a plurality of transit trips including one for each instance of tram 3 during the time interval between 8:00 a.m. and 6:00 p.m. The time independent transit route "tram 4" can be associated with a plurality of transit trips including one for each instance of tram 4 during the time interval between 8:00 a.m. and 6:00 p.m. It can be possible that the service hours are different for tram 3 and for tram 4. For instance, tram 3 can operate from 8:00 a.m. to 5:00 p.m. and tram 4 can operate from 9:00 a.m. to 6:00 p.m. In this case, it can be desirable to recommend tram 3 during its hours of operation and tram 4 during its hours of operation.

To provide recommendations of time independent transit routes between an origin and a destination, aspects of the present disclosure are directed to evaluating and comparing different time independent transit routes over a given time interval. In particular, a score (e.g. a ranking score) is generated for each time independent transit route. The score can be used to evaluate and prioritize the time independent transit routes so that one or more time independent transit routes can be recommended to a user.

The score can be computed by generating a trip duration function for the time independent transit route. The trip duration function specifies a trip cost for the time independent transit route as a function of time (such as departure time or arrival time) over the time interval. For example, the trip duration function can be a function $f(t)$ that for each possible time "t" computes the "cost" associated with reaching the destination including a possible initial waiting time. The trip cost specified by the trip duration function can be the trip duration needed to reach the destination including any initial waiting time. In other implementations, the trip cost for each possible time t can take into account not only trip duration, but also other factors such as cost penalties for walking, transfers, pricing, etc. The trip duration function can be a piecewise linear function with one or more linear trip segments. Each linear trip segment can model the duration or cost, including waiting time, of one of the plurality of transit trips associated with the time independent transit route over at least a portion of the time interval.

The score for each time independent transit route can be determined using the trip duration function for the time independent transit route. For instance, the score can be determined based on an average cost of the time independent transit route determined from the trip duration function. The average cost can be determined as the area between the trip function and a horizontal axis, such as the x-axis (e.g. computed as the integral of the function over the time interval), and dividing the area by the span of the time interval. Other suitable characteristics of the trip duration function can be used to generate the score for the time independent transit route. In certain embodiments, the score for the time independent transit route can also be penalized or otherwise modified based on various factors, such as required walking, required transfers, pricing, and other factors associated with the time independent transit route.

Once determined, the score can be stored in a memory. Upon receipt of a request for transit routes between the origin and the destination, the scores for each time independent transit route can be accessed. Alternatively, the scores for each of the time independent transit routes can be determined in response to the request. One or more of the plurality of time independent transit routes can then be selected to respond to the request based on the scores for each time independent transit route. In this manner, the subject matter of the present disclosure can provide an objective and useful tool for evaluating and recommending time independent transit routes.

With reference now to the FIGS., exemplary embodiments of the present disclosure will now be discussed in detail. FIG. 1 depicts an overview of an exemplary system 100 for transit route planning according to an exemplary embodiment of the present disclosure. The system 100 can include a transit routing platform 110 in communication with a computing device 130 over a network 140. The transit routing platform 110 can be hosted by any suitable computing device, such as a web server. The computing device 130 can be any suitable computing device, such as a laptop, desktop, smartphone, tablet, mobile device, or other computing device.

A user 132 can input a request for one or more transit routes from an origin to a destination into the computing device 130 using a suitable user interface, such as a browser or other interface. The computing device 130 can send the request for transit routing information to the transit routing platform 110. The request can be a request for time independent transit routes or "guidebook" routes that seek a typical transit route from the origin to the destination irrespective of a specific time of day and/or date. As a result, the request may not specify a specific departure time or a specific arrival time. Other suitable requests for transit information can be provided without deviating from the scope of the present disclosure. For instance, a request for transit routes between the origin and destination with specified arrival and/or departure times can be provided.

The transit routing platform 110 can receive the request from the computing device 130. For example, the transit routing platform 110 can include a suitable interface 120 for connecting to the network 140 and receiving the request. In response to the request, the transit routing platform 110 can access transit route data 118. The transit route data 118 can include information associated with a transit system, such as transit schedules, departure times, arrival times, stops, costs, walking distance, transfers, and other information associated with the transit system.

In response to the request, the transit routing platform 110 can implement a route identification module 122 that identifies a plurality of time independent transit routes between the origin and the destination. A route selection module 128 can select one or more of the identified time independent transit routes to respond to the request based on a score generated using a cost model for each identified time independent transit route. The score can be determined in response to the request or can be accessed from a memory. The score can prioritize the time independent transit routes for selection by the route selection module 128.

The score for each time independent transit route can be determined using a route calculation module 124 and a route ranking module 126. For instance, the route calculation module 124 can determine a trip duration function for each time independent transit route. The trip function for each time independent transit route can specify a trip cost (e.g. a trip duration) as a function of time (such as departure time and arrival time) for the time independent transit route. The route ranking module can determine the score (e.g. a ranking score) using characteristics of the trip duration function.

After the route selection module 128 selects one or more time independent transit routes for responding to the request, the transit routing platform can send the one or more time independent transit routes to the user device 130, for instance, over the network 140. The user device 130 can then display the one or more time independent transit routes to the user 132 through a suitable user interface.

Figure 2:
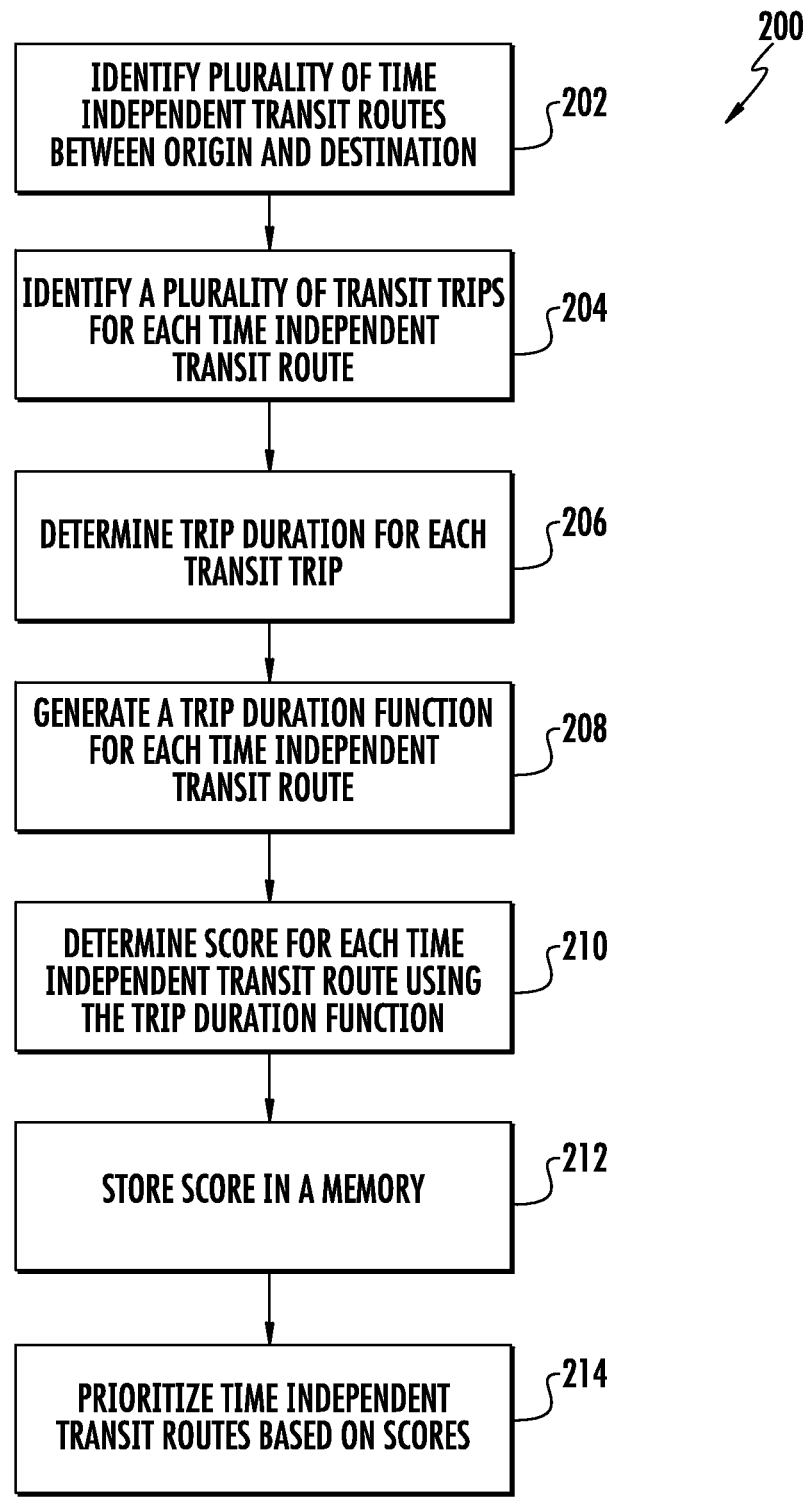
FIG. 2 depicts a flow diagram of an exemplary method for transit route planning according to an exemplary embodiment of the present disclosure.

FIG. 2 depicts a flow diagram of an exemplary method (200) for prioritizing time independent transit routes between an origin and a destination using a cost model according to an exemplary embodiment of the present disclosure. The method (200) can be implemented using any computing device or system, such as the system 600 illustrated in FIG. 11. In addition, FIG. 2 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (202), the method includes identifying a plurality of time independent transit routes between an origin and a destination. The plurality of time independent transit routes can be identified using transit route searching techniques, such as Djikstra search techniques used to search a transit graph modeling a transit network between the origin and the destination. Other suitable techniques for identifying the plurality of time independent transit routes can be used without deviating from the scope of the present disclosure.

Figure 3:
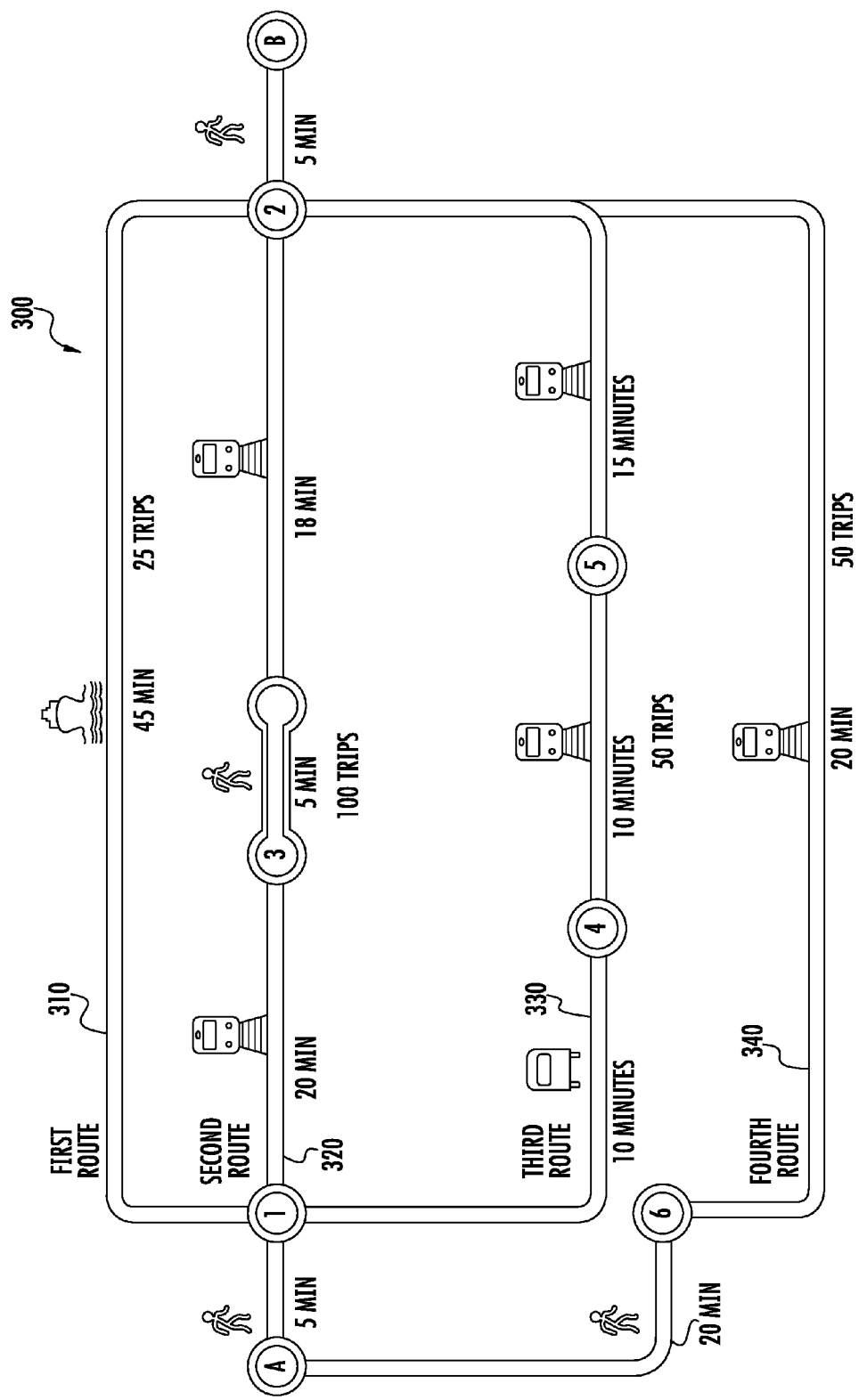
FIG. 3 depicts an exemplary transit system that includes a plurality of time independent transit routes.

FIG. 3 depicts a representation of an exemplary transit system 300 that includes a plurality of identified transit routes 310, 320, 330, and 340 between an origin A and destination B. Each of the transit routes 310, 320, 330, and 340 can involve one or more modes of transportation. For instance, transit route 310 involves walking to Station 1, taking a ferry from Station 1 to Station 2, and walking from Station 2 to the destination B. Transit route 320 involves walking to Station 1, taking rail transportation to Station 3, walking to a tram stop, taking the tram to Station 2, and walking to destination B. Transit route 330 involves taking a bus to Station 4, taking a first tram to Station 5, taking a second tram to Station 2, and walking from Station 2 to the destination B. Transit route 340 involves walking to Station 6, taking rail transportation to Station 2, and walking from Station 2 to the destination B.

At (204) of FIG. 2, a plurality of transit trips associated with each time independent transit route over a time interval can be identified. The time interval can be any suitable time period, such as a business day, a weekend, between the hours of 8:00 p.m. and 10:00 p.m., or other suitable time interval. Each transit trip can be an instance of the transit route using the one or mode(s) of transportation during the time interval. For instance, a transit trip for transit route 310 of FIG. 3 can include a specific trip over the ferry from Station 1 to Station 2 during the time interval. A transit trip for transit route 320 can include a specific trip using both the rail transportation between Station 1 and Station 3 and the tram to Station 2 during the time interval. A transit trip for transit route 330 can include a specific trip using the bus transportation between Station 1 and Station 4, the rail transportation between Station 4 and Station 5, and the tram transportation between Station 5 and Station 2. A transit trip for the transit route 340 can include the rail transportation between Station 6 and Station 2.

For each time independent transit route, there will be a specific number of transit trips during a specified time interval. Referring to the example of FIG. 3, transit route 310 of FIG. has 25 trips using the ferry between Station 1 and Station 2. Transit route 320 has 100 trips using the rail transportation and tram between Station 1 and Station 2. Transit route 330 has 50 transit trips using the bus transportation and trams between Station 1 and Station 2. Transit route 340 has 50 transit trips using rail transportation between Station 1 and Station 2.

Each transit trip can have a specific departure time and a specific arrival time. The departure time and the arrival time can be estimated time(s) or can be times determined or identified from data associated with the transit network, such as transit time tables. Using the departure time and arrival time for each transit trip, the time independent transit routes can be evaluated and prioritized for recommendation to a user.

For instance, at (206), a trip duration can be determined for each transit trip. The trip duration can be determined using time tables associated with the transit trips or can be calculated based on the arrival times and departure times associated with the transit trips. In particular, the duration of a particular transit trip can be equal to the difference between the arrival time and the departure time. If a trip over the time independent transit route involves multiple modes of transportation, the trip duration can based on the departure times and arrival times of each mode of transportation within the trip. The trip duration can also take into account average durations, such as time to transfer or walk between adjacent stations.

At (208), a trip duration function is generated for each time independent transit route. The trip duration function specifies a trip cost for the time independent transit route as a function of time (e.g. departure time or arrival time) for the time interval. The trip cost can be the trip duration for the time independent transit trip. For instance, the trip duration function can be a function $f(t)$ that specifies a trip duration to reach the destination for every time t. The trip duration function can be a piecewise linear function that includes a plurality of linear trip segments. Each linear trip segment models the trip cost, including waiting time, of one of the plurality of transit trips over the time independent transit route as a function of time.

Figure 4:
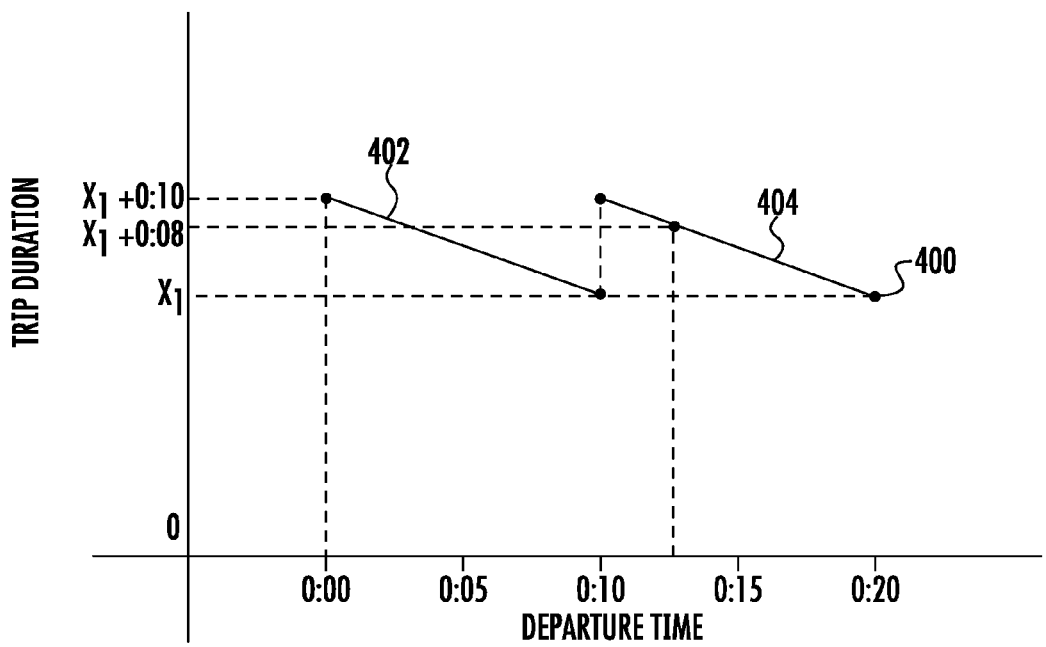
FIGS. 4-9 depict exemplary trip duration functions for time independent transit routes according to exemplary embodiments of the present disclosure.

FIG. 4 depicts an exemplary trip duration function 400 generated for a time independent transit route over a time interval from 0:00 to 0:20. The trip duration function 400 specifies a trip duration for the time independent transit trip as a function of departure time. The trip duration function 400 includes two linear trip segments 402 and 404. The present example will be discussed with reference to two trip segments for purposes of illustration and discussion. Those of ordinary skill in the art, using the disclosures provided herein, will understand that the trip duration function can include many linear trip segments.

The linear trip segments 402 and 404 each model a duration, including waiting time, of one of the plurality of trips over the time independent transit route as a function of departure time. For instance, linear trip segment 402 can be associated with a transit trip that departs at time 0:10 and has a duration of $x_1$. The trip duration function 400 specifies a duration of $x_1$ for a user that begins travel over the time independent transit route at time 0:10. The linear trip segment 402 has a slope of −1 to model waiting time. For instance, if a user begins travel at time 0:00, the user will have to wait 0:10 until the transit trip associated with trip segment 402 departs. Thus, the trip duration function 400 specifies a trip duration of $x_1+0:10$ at time 0:00.

Trip segment 404 models trip duration, including waiting time, in a similar fashion. Linear trip segment 404 can be associated with a transit trip that departs at time 0:20 and has a duration of $x_1$. The trip function 400 specifies a duration of $x_1$ for a user that begins travel over the time independent transit route at time 0:20. The linear trip segment 404 has a slope of −1 to model waiting time. For instance, if a user begins travel at time 0:12, the user will have missed the opportunity to travel on the transit trip associated with the linear trip segment 402. The user will have to wait 0:08 until the transit trip associated with trip segment 404 departs. Thus, the trip duration function 400 specifies a trip duration of $x_1+0:08$ at time 0:12.

Figure 6:
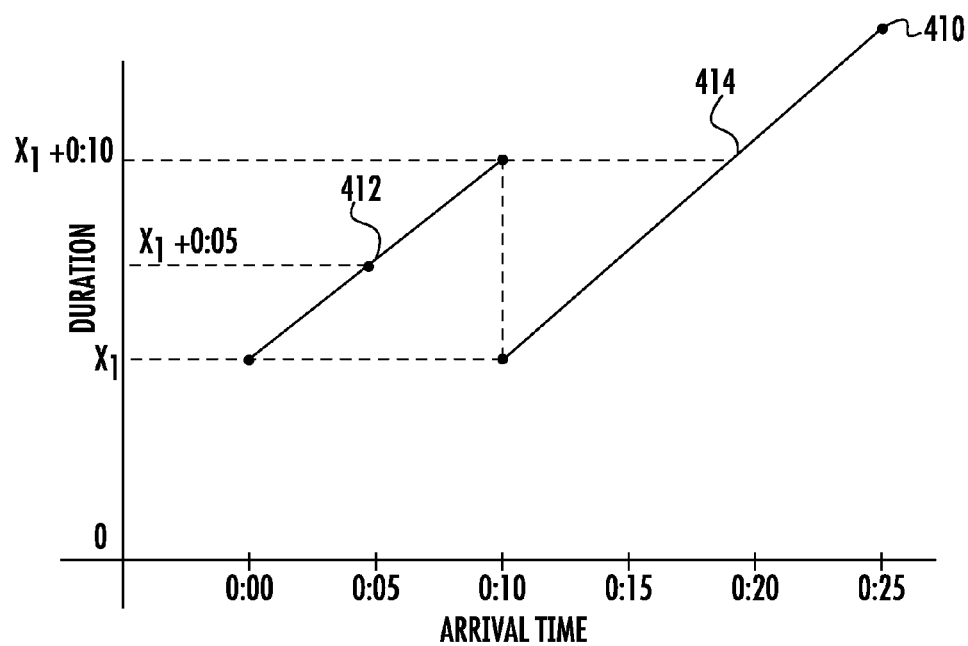

FIG. 6 depicts another exemplary trip duration function 410 generated for a time independent transit route over a time interval from 0:00 to 0:25. The trip duration function 410 specifies a minimum trip duration for the time independent transit trip as a function of arrival time. The trip duration function 410 includes two linear trip segments 412 and 414. The linear trip segments 412 and 414 model a duration, including waiting time of one of the plurality of trips over the time independent transit route as a function of arrival time.

For example, linear trip segment 412 can be associated with a transit trip that arrives at time 0:00 and has a duration of $x_1$. The trip function 410 specifies a duration of $x_1$ for a user that wishes to arrive at time 0:00. The linear trip segment 412 has a slope of 1 to model waiting time. For instance, if a user wishes to end travel at 0:05, the user will have to wait 0:05 after transit trip associated with trip segment 412 arrives. Thus, the trip duration function 410 specifies a trip duration of $x_1+0:05$ at time 0:05.

Trip segment 424 models trip duration, including waiting time, in a similar fashion. Linear trip segment 424 can be associated with a transit trip that arrives at time 0:10 and has a duration of $x_1$. The trip function 410 specifies a minimum duration of $x_1$ for a user that desires to arrive at time 0:00. The linear trip segment 414 has a slope of 1 to model waiting time. For instance, if a user wishes to end travel at time 0:20, the user will have to wait 0:10 after the transit trip associated with trip segment 414 arrives. Thus, the trip duration function 410 specifies a trip duration of $x_1+0:10$ at time 0:20.

In certain cases, a time independent transit route can be associated with a frequency based trip. The exact departure and arrival times for the frequency based trips may be unknown. However, it may be known that over a given time interval, a particular transit trip runs every Y minutes and has a duration of $x_2$. Based on this information, it is known that the frequency based trip will have a maximum duration of $x_2+Y$. A linear trip segment can model this frequency based trip as a linear segment having a slope of 0 that is equal to $x_2+Y$.

Figure 8:
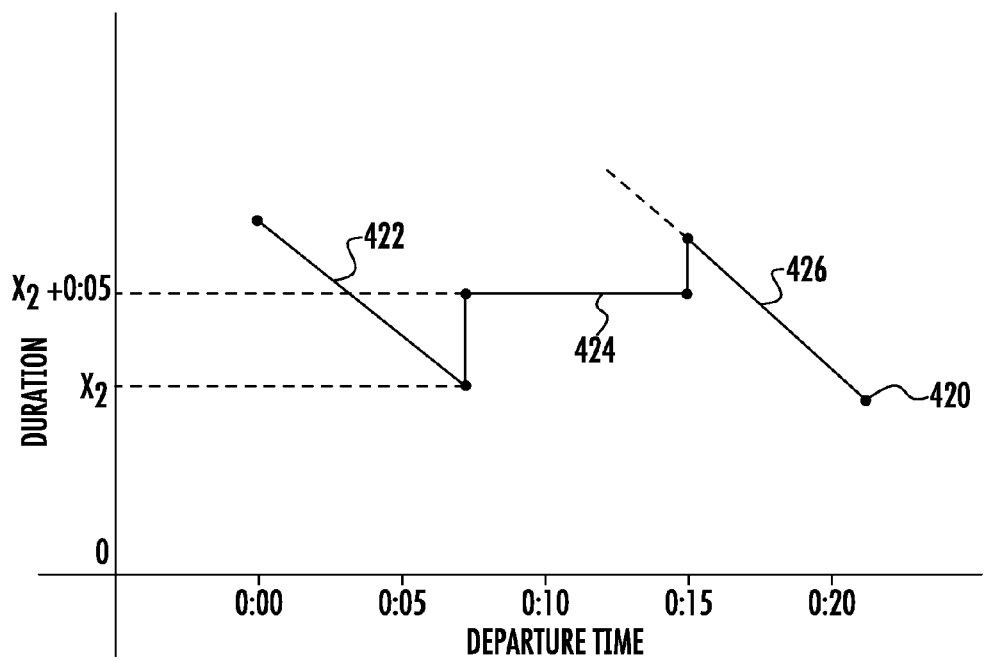

For example, FIG. 8 depicts a trip duration function 420 associated with a time independent transit route that includes a frequency-based trip. Trip duration function 420 specifies a trip duration as a function of departure time. Trip segments 422 and 426 model trips during the time interval with known departure times. Trip segments 422 and 426 have a slope of −1 to model waiting time similar to the trip segments 402 and 404 of FIG. 4.

Trip segment 424 models the frequency based trip. As shown, the trip segment 424 models the frequency based trip as a linear segment having a slope of 0 and is associated with a trip duration of $x_2+0:05$. The zero slope linear segment model associated with the trip segment 424 does not contribute to the entire trip function 420. The can be because transit trips associated with trip segments 422 or 426 may specify reduced trip durations and/or because the frequency based transit trip only runs over a subset of the time interval.

The exemplary trip duration functions of FIGS. 4, 6, and 8 each specify a trip cost based on trip duration as a function of time. In other embodiments, the trip costs specified by the trip duration function can be based on other factors. For instance, the trip cost can be based not only on the trip duration, but also on factors such as required walking, transfers, pricing, etc. In these embodiments, the trip duration function can specify a trip cost based on trip duration and based on a penalty for other factors. For instance, a penalty (e.g. a 5 minute or other suitable penalty) can be added to the trip duration specified by the trip duration function if the time independent transit route requires a transfer. Another penalty (e.g. a 10 minute or other suitable penalty) can be added to the trip duration specified by the trip duration function if the time independent transit route requires walking. The penalty can be based on walking distance or walking time.

The penalty can be incorporated into one or more individual trip segments of the trip duration function or can be incorporated across the entire trip duration function for a time independent transit route. For instance, consider a penalty for pricing for trips that have different prices at different times of the time interval. A first penalty based on the price for a first transit trip can be incorporated into the linear trip segment associated with the first transit trip. A second penalty based on the price for a second transit trip can be incorporated in to the linear trip segment associated with the second transit trip. In this manner, different penalties can be associated with different transit trips in the determination of the trip duration function for the time independent transit route.

Referring back to FIG. 2 at (210), a score can be determined for each time independent transit route using the trip duration function associated with the time independent transit route. The score can be computing using a cost model that assigns a cost to the time independent transit route based on characteristics of the trip function. In a particular implementation, the cost model specifies that the score is equal to or based on an average cost for the time independent transit route determined using the trip function. The average cost can be determined using the trip duration function by calculating an area between the trip duration function and a horizontal axis (e.g. the x-axis) and dividing the area by a span of the time interval.

The area can be computed using any suitable technique, such as by taking the integral of the trip duration function over the time interval. In one example, the average cost of the trip duration function can be computed as follows:

$$AC = \frac{\int_{t=t1}^{t=t2} f(t) dt}{(t2-t1)}$$

where AC is the average cost, t1 is the beginning of the time interval, t2 is the end of the time interval, and $f(t)$ is the trip duration function.

According to another exemplary embodiment of the present disclosure, the score can be computed based on the trip duration function as well as a weighting function w(t) that assigns different weights to different times in the time interval. For instance, trips at night can be provided more weight than trips during the day. In this example, the average cost of the trip duration function can be computed as follows:

$$AC = \frac{\int_{t=t1}^{t=t2} f(t) * w(t) dt}{(t2-t1) * \int_{t=t1}^{t=t2} w(t) dt}$$

where AC is the average cost, t1 is the beginning of the time interval, t2 is the end of the time interval, $f(t)$ is the trip duration function, and w(t) is the weighting function.

The cost model can specify that the score is equal to the average cost determined from the trip duration function as follows:

$$C = AC$$

Where C is the score and AC is the average duration determined using the trip duration function.

The cost model can also, if desired, incorporate or add penalties to the score based on various factors that are not otherwise incorporated into the trip duration function. For instance, the cost model can specify the score as set forth below:

$$C=AC+P+O$$

where C is the score, AC is the average cost computing using the trip duration function, P is a penalty, and O provides an adjustment to the cost model based on other factors. The penalty P a penalty can be added to the score for walking time, walking duration, number of transfers, costs, or other suitable factors. The other factors O can be used to adjust or modify the score for other factors, such as user preference factors for particular modes of transportation.

Referring back to FIG. 2 at (212), the score associated with each time independent transit route can be stored in a memory. The score can then be accessed, for instance, by a transit routing platform, for evaluating and prioritizing the time independent transit routes. At (214), the time independent transit routes can be prioritized based on the scores. Because transit routes associated with smaller average costs are typically preferable, time independent transit routes associated with lower scores can be prioritized relative to time independent transit routes with higher scores.

Figure 5:
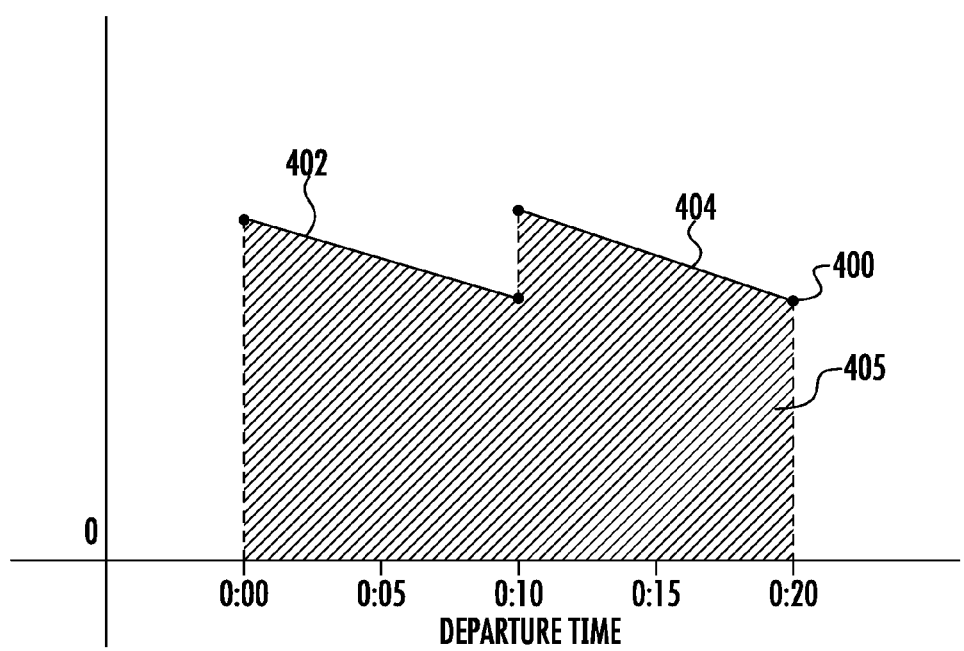
Figure 7:
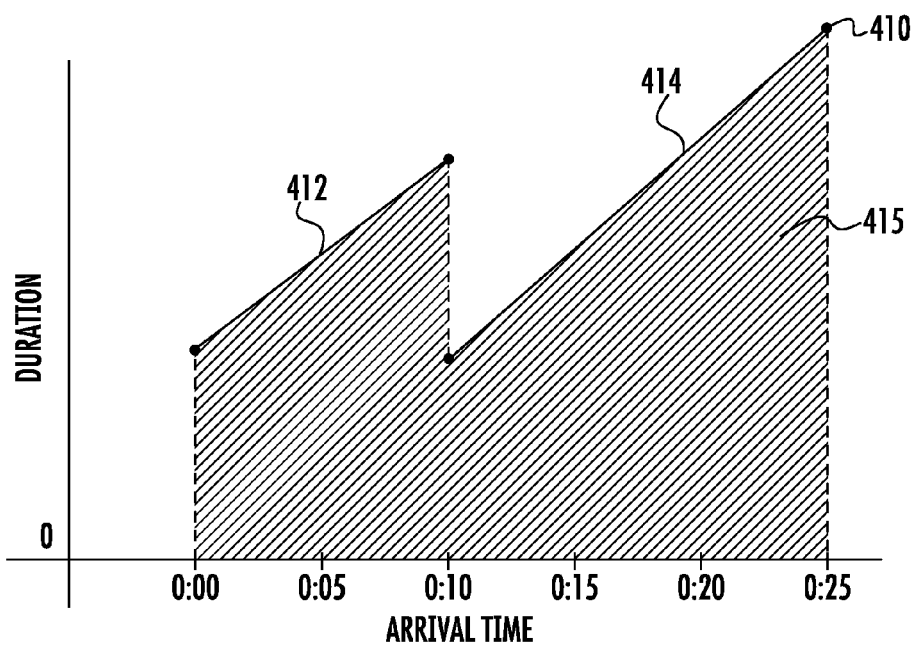
Figure 9:
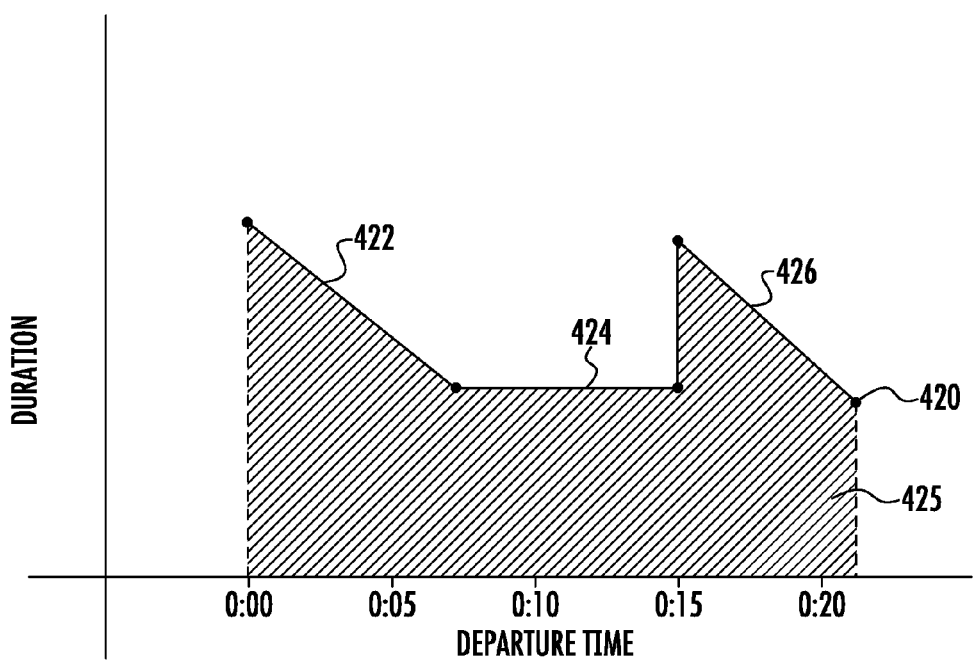

For example, FIG. 5 depicts the area 405 between the trip duration function 400 of FIG. 4 and the x-axis. The cost model can specify a score for the time independent transit route based at least in part on this area 405. Similarly, FIG. 7 depicts the area 415 between the trip duration function 410 of FIG. 6 and the x-axis. FIG. 9 depicts the area 425 between trip duration function 420 of FIG. 8 and the x-axis. The area 405 can be smaller than the area 415, which can be smaller than the area 425. Thus, the transit route associated with the trip duration function 400 can be prioritized relative to the transit routes associated with the trip duration functions 410 and 420.

Figure 10:
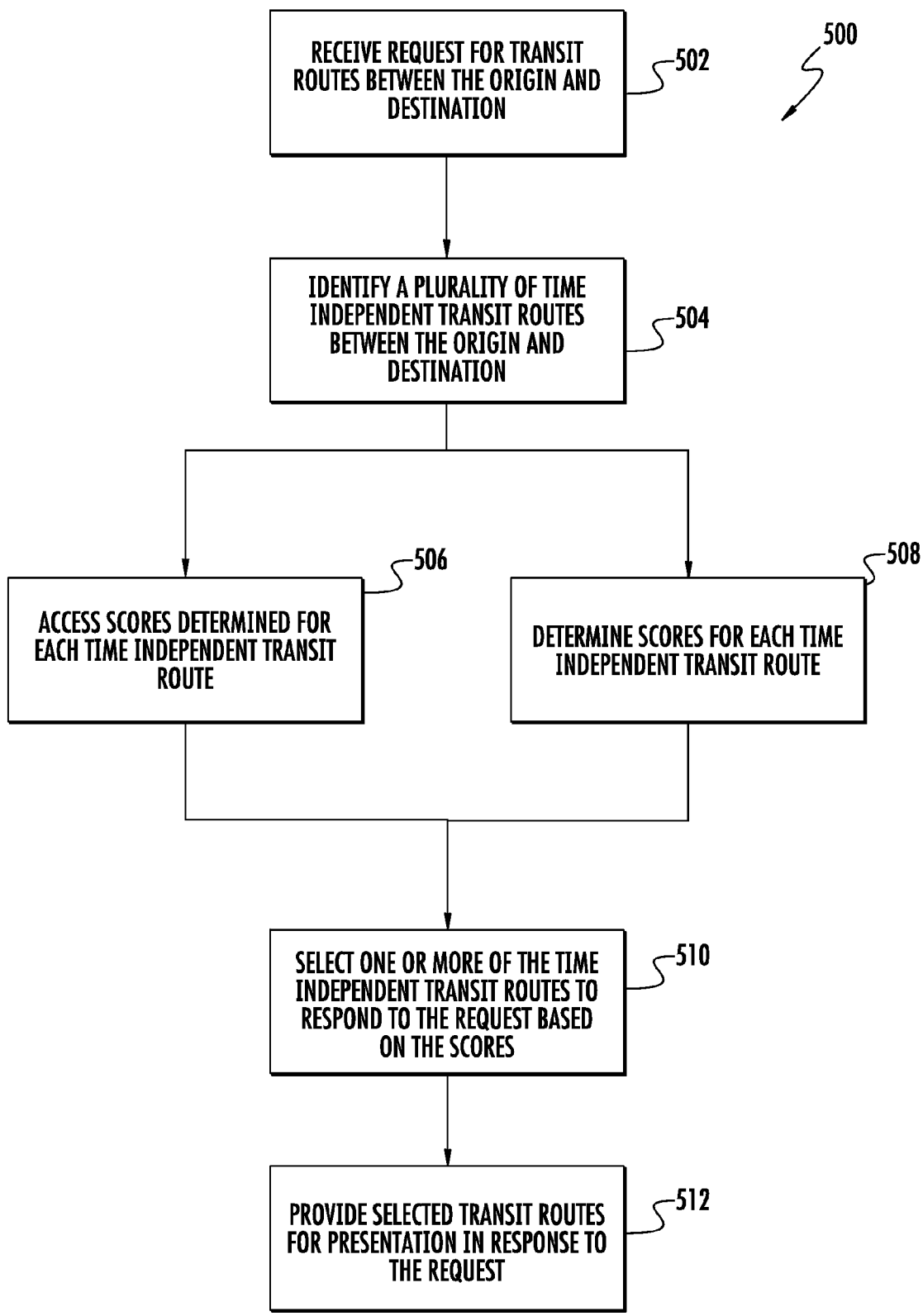
FIG. 10 depicts a flow diagram of an exemplary method for transit route planning according to an exemplary embodiment of the present disclosure.

Referring now to FIG. 10, an exemplary method (500) for recommending time independent transit routes according to exemplary embodiments of the present disclosure will now be discussed in detail. At (502) the method includes receiving a request for transit routes between the origin and destination. For instance, the transit routing platform 110 of FIG. 1 can receive a request for transit routes from a user device 130 over a network 140.

At (504), a plurality of time independent transit routes between the origin and the destination are identified. For instance, the route identification module 122 of FIG. 1 can identify a plurality of time independent transit routes between the origin and the destination based on transit route data 118 using suitable search techniques, such as Djikstra search techniques. Once identified, scores associated with each time independent transit route are obtained to prioritize the time independent transit routes.

For example, at (506) of FIG. 10, scores determined for each time independent transit route can be accessed from a memory. Referring to the exemplary system of FIG. 1, the scores can have been previously determined by the route calculation module 124 and the route ranking module 126 and stored in a memory, for instance, as part of the transit route data 118. In response to the request, the scores stored in the memory can be accessed and used to prioritize the time independent transit routes.

Alternatively as shown at (508) of FIG. 10, the scores can be determined for each time independent transit route in response to the request. For instance, the route calculation module 124 and route ranking module 126 of FIG. 1 can determine the scores for each of the identified time independent transit routes in near real time in response to receiving the request.

Once the scores for each time independent transit route have been accessed or determined, one or more of the time independent transit routes are selected to respond to the request based on the scores as shown at (510) of FIG. 10. For instance, the route selection module 128 of FIG. 1 can select the one or more time independent transit routes with the lowest scores to respond to the request.

At (512) of FIG. 10, the selected time independent transit routes are provided for recommendation to the user in response to the request. For instance, the transit routing platform 110 of FIG. 1 can deliver the selected time independent transit routes to the user device 130 over the network 140. The user can then use the recommended transit routes in planning a transit journey.

Figure 11:
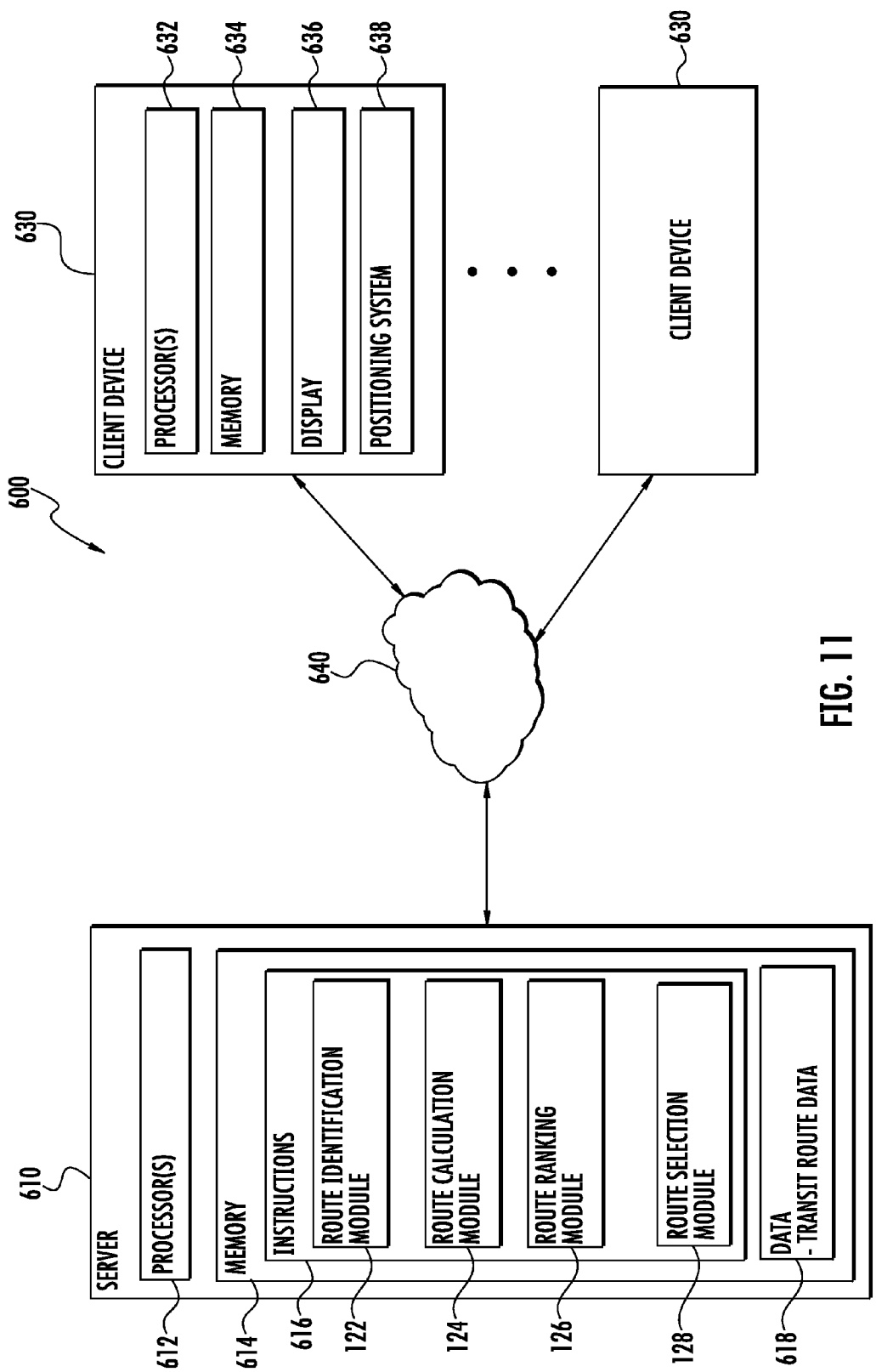
FIG. 11 depicts a block diagram of an exemplary computer-based system for transit route planning according to an exemplary embodiment of the present disclosure.

FIG. 11 depicts an exemplary computing system 600 that can be used to implement the methods and systems for transit routing planning according to aspects of the present disclosure. The system 600 is a client-server architecture that includes a server 610 that communicates with one or more client devices 630 over a network 650. The system 600 can be implemented using other suitable architectures, such as a single computing device.

The system 600 includes a server 610, such as a web server. The server can be implemented using any suitable computing device(s). The server 610 can have a processor(s) 612 and a memory 614. The server 610 can also include a network interface used to communicate with one or more remote computing devices (e.g. client devices) 630 over a network 640.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement the route identification module 122, the route calculation module 124, the route ranking module 126, and the route selection module 128.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 618, such as transit route data and scores generated for time independent transit routes, that can be retrieved, manipulated, created, or stored by processor(s) 612. The data 622 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two clients 630 are illustrated in FIG. 11, any number of client devices 630 can be connected to the server 610 over the network 640. The client devices 630 can be any suitable type of computing device, such as a general purpose computer, special purpose computer, laptop, desktop, integrated circuit, mobile device, smartphone, tablet, or other suitable computing device.

Similar the computing device 610, a client device 630 can include a processor(s) 632 and a memory 634. The memory 634 can store information accessible by processor(s) 632, including instructions that can be executed by processor(s) and data. The client device 130 can include various input/output devices for providing and receiving information from a user, such as a touch screen, touch pad, data entry keys, speakers, and/or a microphone suitable for voice recognition. For instance, the computing device 630 can have a display 636 for presenting information, such as recommended time independent transit routes to a user.

The client device 630 can also include a positioning system 638 that can be used to identify the position of the client device 630. The positioning system 638 can be optionally used by the user to monitor the user's position relative to a transit route. The positioning system 638 can be any device or circuitry for monitoring the position of the client device 630. For example, the positioning device 638 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In situations in which the systems and method discussed herein collect information about users, such as position data, user preferences, or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in or more ways before it is stored or used, so that personally identifiable information is removed.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of transit route planning, comprising:
    identifying, by one or more computing devices, a plurality of time independent transit routes between an origin and a destination, each of the time independent transit routes comprising a plurality of trips over a time interval, each of the time independent transit routes comprising one or more modes of transportation;
    generating, by the one or more computing devices, a trip duration function for each of the plurality of time independent transit routes, the trip duration function specifying a trip cost as a function of time over the time interval, the trip duration function being a piecewise linear function comprising a plurality of linear trip segments, each linear trip segment modeling the trip cost, including waiting time, of one of the plurality of trips in the time independent transit route as a function of time;
    computing, by the one or more computing devices, a score for each of the plurality of time independent transit routes based at least in part on an average cost of the time independent transit route over the time interval, the average cost being calculated using the trip duration function;
    storing, by the one or more computing devices, the score for each of the plurality of time independent transit routes in a memory;
    receiving, by the one or more computing devices, a request for transit routes between the origin and the destination;
    accessing, by the one or more computing devices, the score for each of the plurality of time independent transit routes;
    selecting, by the one or more computing devices, one or more of the plurality of time independent transit routes to respond to the request based on the score for each of the plurality of time independent transit routes;
    and then displaying, by the one or more computing devices, the one or more time independent transit routes to respond to the request to the user.

2. The computer-implemented method of claim 1, wherein the scores for the plurality of time independent transit routes prioritize the time independent transit routes with smaller average costs.

3. The computer-implemented method of claim 1, wherein the trip duration function specifies the trip cost for the time independent transit route as a function of departure time over the time interval.

4. The computer-implemented method of claim 3, wherein one or more of the plurality of linear trip segments has a slope of −1 to model the trip cost, including waiting time, of one of the plurality of trips as a function of departure time.

5. The computer-implemented method of claim 1, wherein the trip duration function specifies the trip cost for the time independent transit route as a function of arrival time over the time interval.

6. The computer-implemented method of claim 5, wherein one or more of the plurality of linear trip segments has a slope of 1 to model the trip cost, including waiting time, of one of the plurality of trips as a function of arrival time.

7. The computer-implemented method of claim 1, wherein the plurality of trips for at least one of the plurality of time independent transit routes comprises a frequency based transit trip.

8. The computer-implemented method of claim 7, wherein one of the plurality of linear trip segments of the trip duration function models the frequency based transit trip as a constant trip cost over at least a portion of the time interval.

9. The computer-implemented method of claim 1, wherein the average cost of the time independent transit route over the time interval is computed by determining an area between the trip duration function and a horizontal axis and dividing the area by a span of the time interval.

10. The computer-implemented method of claim 1, wherein the trip cost is based at least in part on a trip duration.

11. The computer-implemented method of claim 1, wherein the trip cost is based at least in part on a trip duration and a penalty.

12. The computer-implemented method of claim 11, wherein the penalty is based at least in part on walking time or walking distance associated with the time independent transit route.

13. The computer-implemented method of claim 11, wherein the penalty is based at least in part on the number of transfers or pricing associated with the time independent transit route.

* * * * *